Patented Mar. 25, 1941

2,235,840

UNITED STATES PATENT OFFICE 2,235,840

PROCESS FOR PRODUCING HYDROXY CITRONELLAL

Walter Christian Meuly, New Brunswick, N. J., assignor to E. I. du Pont de Nemours & Company, Wilmington, Del., a corporation of Delaware No Drawing. Application May 15, 1937, Serial No. 142,880

6 Claims. (Cl. 260—601)

This invention relates to new methods for the hydration of citronellal whereby to produce hydroxy citronellal.

The manufacture of hydroxy citronellal comprises the steps of (1) protecting the aldehyde function of citronellal by converting it into the citronellal bisulphite compound, (2) subjecting this product to the influence of fairly concentrated sulfuric acid so as to effect hydration (addition of the elements of water to the double bond of citronellal) and (3) decomposing the bisulphite compound so as to liberate the hydroxy aldehyde. The literature contains only brief general references to these reactions. Poucher, Perfumes, Cosmetics and Soaps, vol. I, pg. 182, states: "The hydroxy aldehydes are prepared by hydrating the corresponding unsaturated aldehydes, generally by treating the bisulphite compound with fairly concentrated sulfuric acid . . . ."

It appears, however, to have been the prevalent opinion that the bisulphite compound must be isolated in dry form before further treatment. Gattefosse, in "Nouveaux Parfums Synthetiques," 2d edition, 1927, page 195, referring to the hydration of citronellal, states:

"One must work at low temperature and with a bisulphite compound perfectly pure and dry."

The dry bisulphite, however, is not an article of commerce, and its preparation is attended with difficulties, because it is not very stable, being susceptible of spontaneous combustion.

Likewise, it would appear from those references that the hydration may be effected simply by operating upon the dry bisulphite addition-compound with fairly concentrated sulfuric acid. However, this method gives poor yields and is not applicable to the manufacture of hydroxy citronellal on a commercial scale.

When dealing with manufacture on a large scale, one must consider also other factors. For instance, citronellal generally carries with it certain impurities, chiefly isopulegol, which are not aldehydes and which are undesirable in the final product. Other quantities of isopulegol may be formed in the course of bisulphite treatment. Moreover, the isopulegol, although regarded as an impurity in the hydroxy citronellal, has a technical value of its own, and it is desirable, from the viewpoint of economical practice, to recover it in usable form.

Now, according to my improved process, all the above difficulties are overcome in an efficient manner. Hydroxy citronellal is obtained in excellent yield and in a state of high purity; the isopulegol by-product is recovered; and the entire process is characterized by high efficiency and economy of both labor and materials.

In the preferred form of my invention, citronellal is treated with an aqueous solution of an alkali-metal bisulfite. The crystalline citronellal bisulfite compound so formed is then separated by filtration, and washed with a liquid hydrocarbon until substantially all of the water has been displaced, and the impurities have been washed out. From the washings, isopulegol may be recovered by distillation or otherwise. The washed cake, including its hydrocarbon content, is then treated with a solution of sulfuric acid of approximately 50% strength by weight. By neutralization and decomposition with an excess of caustic soda, the hydroxy citronellal is liberated in the usual manner. It will be contained in the hydrocarbon phase from which it may be separated by distillation.

The following examples will serve to disclose more fully the present invention. All quantities are stated in parts by weight. These examples are not to be construed as limiting the invention.

Example 1

To 192 parts technical citronellal (80% citronellal) add under vigorous agitation 110 parts of sodium bisulphite in the form of a 30% solution (obtained by dissolving 110 parts of sodium bisulphite in 257 parts of water). The bisulphite compound separates out as a thick whitish paste. The reaction is completed by gentle heating. The reaction mass is now filtered, and the filter-cake is washed repeatedly with a benzol-toluol mixture (50:50) until substantially all the residual water has been replaced by hydrocarbon. This may require about 10 washings with about 100 parts of benzol-toluol in each washing.

The washed paste weighs about 600 to 650 parts and contains 260–270 parts of citronellal bisulphite compound. The paste is ready to be hydrated, and for this purpose 200 to 1000 parts of 50% sulfuric acid are added to it while maintaining the mass at a temperature below 0° C. The mass is now neutralized slowly with 10% aqueous sodium hydroxide solution, and additional 400 to 800 parts of 10% aqueous sodium hydroxide are stirred into the mass while maintaining the latter at below room temperature, to effect decomposition of the bisulfite compound. The hydroxy-citronellal which thus becomes liberated is contained in the hydrocarbon layer, and may be recovered by distilling off the solvent, and fractionating the crude hydroxy citronellal.

The hydroxy citronellal is of high purity and is obtained with an excellent yield.

*Example 2*

By replacing the benzol-toluol mixture used in Example 1 with equal weights of toluol, or with a light petroleum fraction or in fact with any hydrocarbon or mixture of hydrocarbons which is liquid at the hydration temperature, substantially similar results will be obtained.

It will be understood that the above examples are merely illustrative, and that the procedure may be varied within wide limits. Thus, the quality of the citronellal may vary within wide limits and even inferior grades may be successfully employed, because all impurities are completely removed.

In the first step of the process the above examples show blocking the aldehyde group with sodium bisulfite to prevent it from interfering with the subsequent hydration treatment. This blocking is known and may be effected in any desired manner. In lieu of sodium bisulphite, other alkali metal bisulphites, such as potassium bisulphite, or materials which when united produce the bisulphites, such as alkali metal meta bisulphites or sulphites plus acid, may be used.

If desired the formation of the bisulfite compound in the first step of the process may be effected in the presence of alcohol (Berichte vol. 17, p. 2109).

In the washing step other liquids than benzene and toluene may be employed. In general any liquid which is inert toward 50% sulfuric acid and does not solidify at the hydration temperature may be used. Examples of suitable liquids are the liquid hydrocarbons, aliphatic, aromatic and alicyclic, for instance, xylene, cyclohexane or naphtha. Non-hydrocarbon liquids may also be employed, for instance diethyl ether, di-isopropyl ether, trichlorethylene, and the like. It will be noted that all these are non-hydroxylic organic liquids, inert toward 50% sulfuric acid and of limited solubility therein compared to hydroxylic solvents (e. g. water or alcohol), and that their freezing point is sufficiently low to maintain them in liquid state at the temperature of hydration (about or below 0° C.).

The process described herein has been found highly efficient and economical for the manufacture of hydroxy-citronellal on a commercial scale. The yield is much higher than that obtained by direct treatment of dry citronellal bisulphite with fairly concentrated sulphuric acid, as suggested by Poucher. The purity of the product is excellent. Moreover, the isopulegol is recovered efficiently as a by-product of commercial value, and thus further reduces the cost of the hydroxy citronellal.

It is apparent that many widely different embodiments of this invention may be made without departing from the spirit and scope thereof, therefore, the invention is not to be limited except as indicated in the appended claims.

I claim:

1. In the process of hydrating citronellal, the steps which comprise treating the citronellal with an alkali metal bisulphite in a medium which is miscible with sulfuric acid then separating the citronellal bisulphite from the bulk of the bisulfiting medium, and thereafter washing the citronellal bisulphite with an organic liquid which is inert toward the components of the reaction mass and is of limited solubility in 50% sulfuric acid compared to water, and whose freezing point is sufficiently low to maintain it in liquid state at the temperature of hydration.

2. In the process of hydrating citronellal, the steps which comprise treating the citronellal with aqueous alkali metal bisulphite, then separating the citronellal bisulphite by filtration and thereafter washing the citronellal bisulphite with an organic liquid which is inert toward the components of the reaction mass and is substantially insoluble in 50% sulfuric acid, and whose freezing point is sufficiently low to maintain it in liquid state at the temperature of hydration.

3. In the process of hydrating citronellal the steps which comprise treating citronellal with an alkali metal bisulphite in a medium which is miscible with sulfuric acid, separating the citronellal bisulphite by filtration, then washing the citronellal bisulphite with a liquid hydrocarbon of low molecular weight until the washings no longer contain any other solvent and thereafter hydrating the citronellal bisulphite with sulfuric acid solution.

4. In the process of hydrating citronellal, the steps which comprise treating the citronellal with aqueous alkali metal bisulphite, separating the citronellal bisulphite from the bulk of the aqueous bisulfite solution, then washing the citronellal bisulphite with a normally liquid hydracarbon of the benzene series until the residual water has been displaced, and thereafter hydrating the citronellal bisulphite by treating with an approximately 50% sulfuric acid solution in the presence of the aforementioned liquid hydrocarbon.

5. In the process of hydrating citronellal, the steps which comprise reacting the citronellal with aqueous sodium bisulphite, separating the citronellal bisulphite from the bulk of aqueous mass, washing the citronellal bisulphite with a benzol-toluol mixture until the residual water has been displaced, and thereafter hydrating the citronellal bisulphite by treating it with sulfuric acid solution without removing the adhering hydrocarbon.

6. In the process of producing hydroxy citronellal by reacting citronellal with a solution of sodium bisulfite, hydrating the reaction product thereof with sulfuric acid, and neutralizing and decomposing the resulting product with an excess of caustic soda, the steps which comprise forming the bisulfite compound of citronellal in the presence of a liquid which is a solvent for sodium bisulfite, separating the resulting citronellal bisulfite from the bulk of said liquid and washing the residue with sufficient quantities of a hydrocarbon consisting at least in part of toluene to displace substantially all the adhering liquid by said hydrocarbon, and thereupon proceeding with the hydration treatment, without removing the adhering hydrocarbon.

WALTER CHRISTIAN MEULY.